Oct. 1, 1946.　　　J. P. CANAVAN　　　2,408,508
NON-CHAFING CATAMENIAL PAD
Filed Dec. 1, 1942　　　4 Sheets-Sheet 1
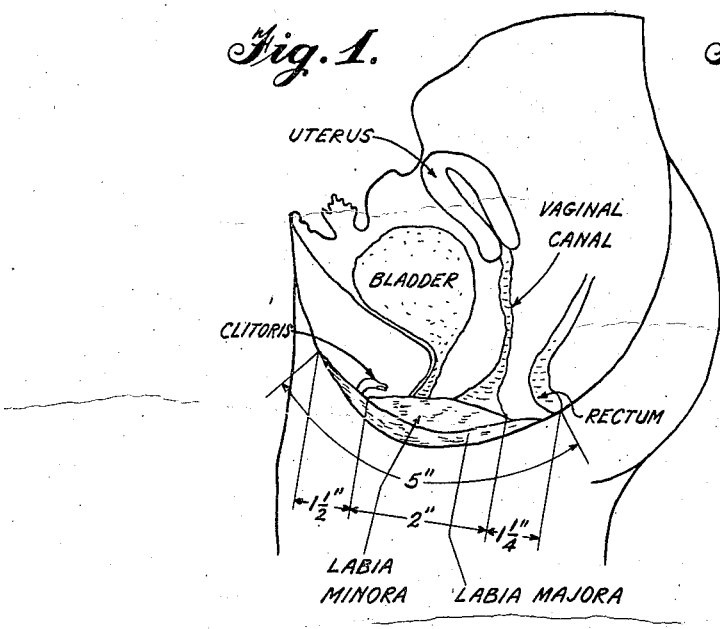
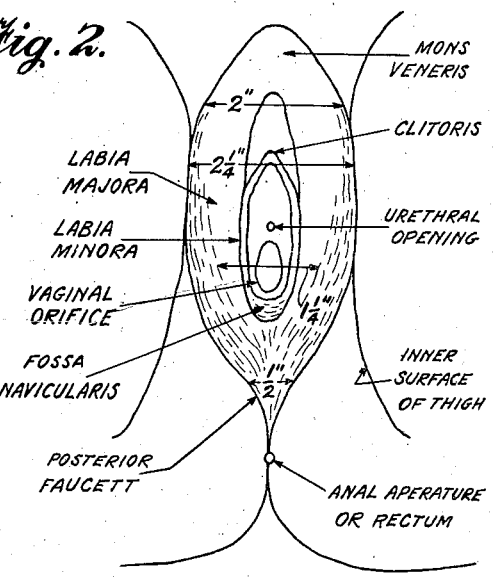
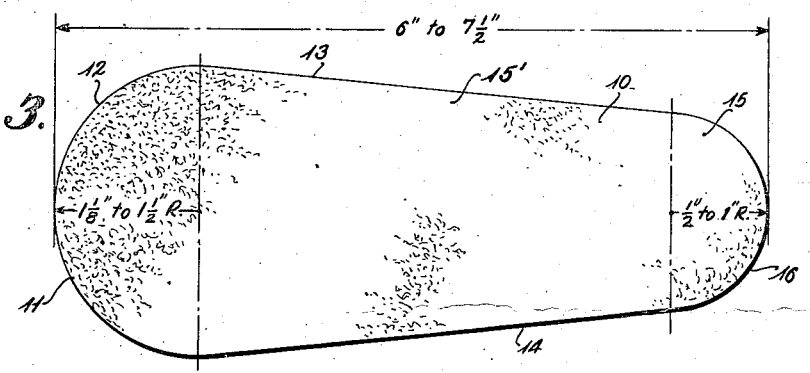
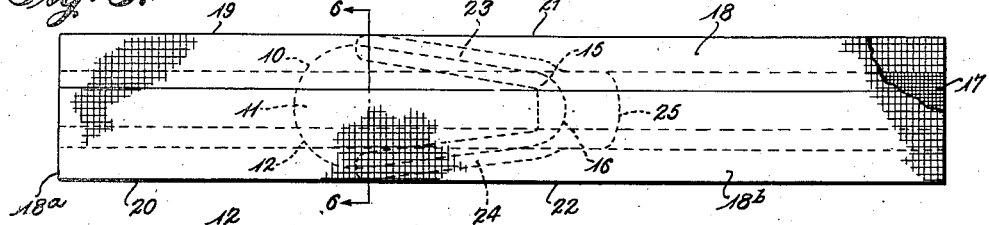
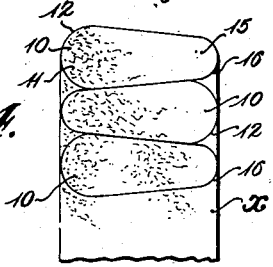
Inventor
John P. Canavan
By Lee J. Gary
Attorney Oct. 1, 1946.  J. P. CANAVAN  2,408,508
NON-CHAFING CATAMENIAL PAD
Filed Dec. 1, 1942  4 Sheets-Sheet 2

Inventor
John P. Canavan
By Lee J. Gary
Attorney

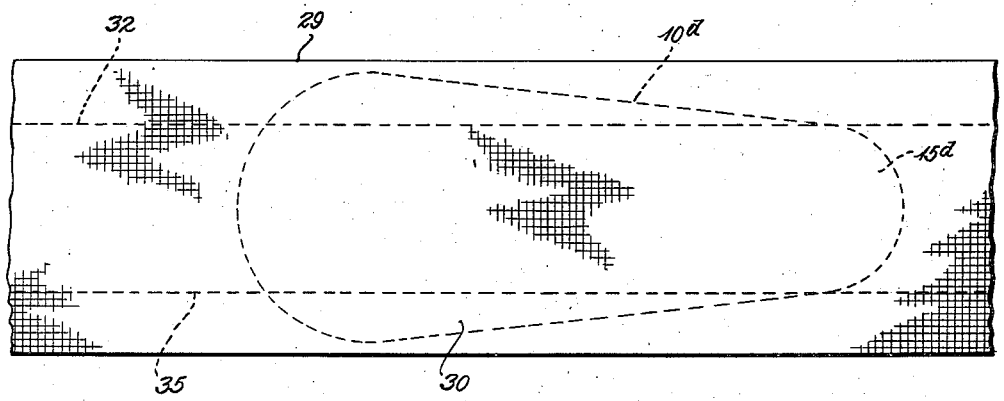
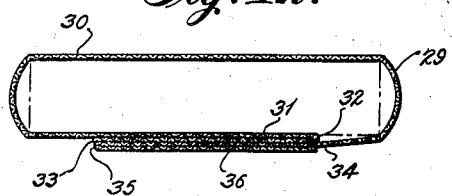 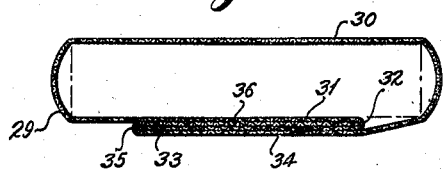
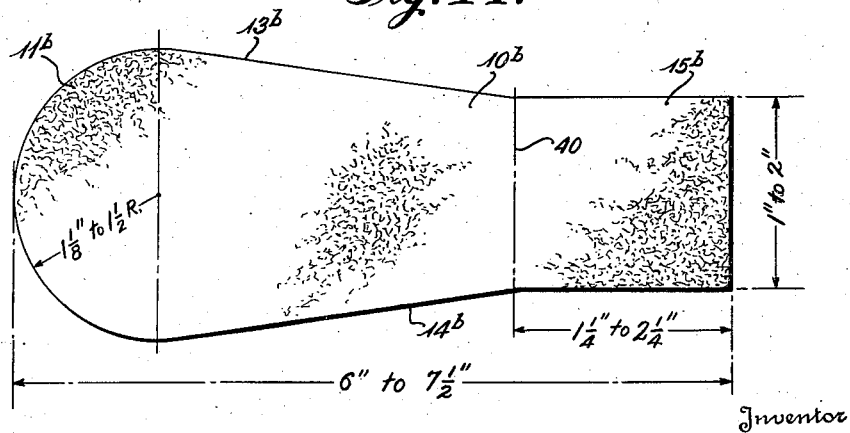

Oct. 1, 1946.  J. P. CANAVAN  2,408,508
NON-CHAFING CATAMENIAL PAD
Filed Dec. 1, 1942   4 Sheets-Sheet 4

Inventor
John P. Canavan
By Lee J. Gary
Attorney

Patented Oct. 1, 1946

2,408,508

UNITED STATES PATENT OFFICE 2,408,508

NONCHAFING CATAMENIAL PAD

John P. Canavan, Neenah, Wis.

Application December 1, 1942, Serial No. 467,491

3 Claims. (Cl. 128—290)

This application is a continuation-in-part of my application Serial No. 263,596 filed March 23, 1939, and entitled Nonchafing catamenial pad which in turn is a continuation-in-part of my earlier filed application Serial No. 236,675 filed October 24, 1938, and entitled Catamenial pad.

This invention relates to catamenial pads and more generally to sanitary bandages to be worn by women during the menstrual period or by those subjected to vulva, vaginal, or uterine discharges.

At the present time (and for a great many years in the past) the most common form of sanitary pad or napkin commercially available for use by women during the menstrual period consists of a generally oblong, arcuate ended pad of absorbent material enclosed in a sheet of loosely woven gauze. These pads are of standard dimensions, approximately 9 inches long and 3 inches wide for adult use (the "junior" size being slightly smaller). In view of their configuration and width such pads inherently cause considerable discomfort to the wearer, and very often chafing, due to the fact that they must be worn laterally compressed, or "bunched," or "packed" between the thighs. Moreover, due to their length, they extend rearwardly of the rectum a considerable distance and produce a "wad" at the rectum which creates a source of continuous discomfort, particularly when the wearer is seated. This wad not only causes discomfort, but distorts the natural anatomical relations around the vulva and anus. These disadvantages have long been known and tolerated because they were thought to be inescapable. It is true, that long recognition of the problem has brought forth numerous suggestions and variations in sanitary napkin construction but none of these has been commercially adopted to supplant the well-known, conventional form of catamenial pad.

The above mentioned width and length of conventional catamenial pads and their customary manner of being worn have been predicated upon the belief that it is essential to have a substantial portion of the pad extend rearwardly of the rectum in order to absorb the material discharged from the uterus, etc., it being the common and generally accepted belief that the discharged material travels downwardly and rearwardly through the pad by gravity. I have discovered that, contrary to the foregoing generally accepted belief, the absorbing action of the pad is such that it causes the discharged material to travel forwardly and upwardly by capillary action rather than downwardly and rearwardly by gravity. I have also found by actual tests and the study of the female anatomy that it is unnecessary for the pad to extend beyond the rear end of the perineum or to be of too great a width at this point because of the natural relations. On the basis of this knowledge I have devised a catamenial pad, which is a radical departure from conventional pads now in universal use but which provides the same degree of safety as said conventional pads, and at the same time eliminates all chafing and discomfort due to the excessive bulk of said conventional pads.

According to the principles of the present invention, the absorbent pad is given a predetermined shape such that it substantially conforms in contour with the natural anatomical curves of the body in the region of the female genitalia comprising the thighs, buttocks and perineum parts. Furthermore, the pad is considerably shorter than conventional pads and is made of such length that it is adapted to be worn with its rearmost region teminating at the anal aperture and its forward region terminating at a point slightly beyond the mons Veneris.

The principal advantages of the present invention, obviously, are two-fold. First, all discomfort to the wearer from the pad per se is definitely eliminated, and, secondly, the pad can be manufactured at a substantial saving due to the fact that at least 30% less absorbent material is required. Additional and commercially important advantages arise from the fact that less gauze is required to wrap the absorbent pad, smaller cartons may be used in shipment and the shipping costs themselves materially reduced due to the smaller weight and bulk of the product. Still greater economy can be effected by eliminating the gauze altogether, as will appear more fully hereinafter.

Another novel feature of the present catamenial device is the incorporation therein of a supporting strip of predetermined width which extends longitudinally of the absorbent pad along the lower side thereof and which is adapted to maintain said pad laterally substantially flat and thereby prevent roping and twisting of said pad. In one form of the invention the pad and supporting strip are enclosed in a gauze sheet or envelope, and in accordance with another form of the invention the longitudinal edges of the gauze sheet are so overlapped as to provide in effect a "built in" longitudinal band rendering the use of a separate supporting strip unnecessary.

A further feature of the invention resides in improved moistureproofing of certain parts of the catamenial pad.

A still further feature resides in the provision of an improvement in catamenial pads to render such pads non-chafing even during body movements caused by walking that normally results in chafing caused by friction with the natural anatomical curves of the body in the region of the female external genitalia comprising the thighs, buttocks, and peri-anal parts.

The principal object of the present invention is to provide a catamenial pad which will eliminate all discomfort to the wearer.

Another object of the invention is to improve the construction of catamenial pads by providing features that preclude chafing to the wearer.

Another object is to provide a catamenial pad possessed of improved non-chafing features to eliminate frictional edge contact with the natural anatomical curves of the body in the region of the female external genitalia comprising the thighs, buttocks and perineum occurring in the relatively changing positions of the body occasioned in walking and other movements.

Still another object is to provide a catamenial pad with a non-chafing finish affording the wearer increased comfort through the elimination of skin inflammation in the contact regions of the female external genitalia, thighs and perineum.

A further object is the provision of a catamenial pad envelope compositely incorporated with a moistureproof substance to afford smooth non-chafing contact with the adjacent contour of the female parts and thus afford greater physical comfort.

A still further object is the provision of a catamenial pad envelope compositely incorporated with a moistureproof substance that precludes the possible striking through of the menstrual flow under conditions that are sometimes beyond the control of the wearer.

Still a further object is the provision of a sanitary catamenial pad envelope compositely incorporated with an impervious substance to prevent uterine discharge from striking through the absorbent cellular pad which may consist of less material than heretofore thought necessary and is conducive to even greater comfort with increased absorbent effectiveness.

An additional object is to provide a catamenial pad envelope compositely incorporated with a moistureproof substance to prevent menstrual excretion from striking therethrough and provide non-chafing body contacting surfaces conducive to added physical and mental comfort of the wearer.

Other objects and advantages will appear from the following description taken in conjunction with the accompanying drawings in which:

Figure 1 is a diagrammatic, dimensioned, cross-sectional view of the female pelvic region showing the uterus, vaginal canal, etc.;

Figure 2 is an elevational view of the external genitalia;

Figure 3 is a dimensioned, plan view of a preferred form of pad element, the dimensions given being such as to include a satisfactory range for "junior" as well as "regular and super" size pads;

Figure 4 is a diagrammatic view illustrating the manner in which pad elements of the type shown in Figure 3 may be cut from sheet or strip material in mass production;

Figure 5 is a top plan view of a complete catamenial device having non-chafing edges embodying features of the present invention;

Figure 9 is a top plan view of a modified embodiment of the catamenial pad shown in Figure 5 with the bottom gauze sheet of the envelope opened to clarify the showing of a moistureproof lower region to prevent striking through;

Figure 11 is a plan view of a catamenial device having the enclosing gauze sheet so folded along the underside of the pad as to eliminate the use of the supporting strip shown in Figures 5 and 9;

Figure 12 is an exaggerated cross-sectional view of only the gauze sheet of Figure 11 illustrating one manner in which said gauze sheet may be folded to provide a plurality of layers of fabric at the underside of the pad adapted to serve as a substantially non-stretchable supporting band;

Figure 13 is a view similar to Figure 12 illustrating another manner of folding the gauze sheet;

Figure 14 is a dimensioned plan view of a slightly modified form of pad element;

Figure 18 is a plan view of another embodiment of the invention wherein the gauze wrapper is entirely dispensed with;

Figure 6:
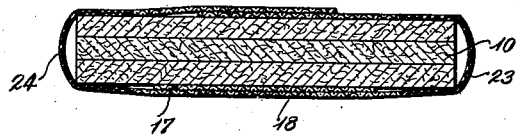
Figure 6 is a transverse sectional view taken substantially along line 6—6 of Figure 5.
Figure 7:
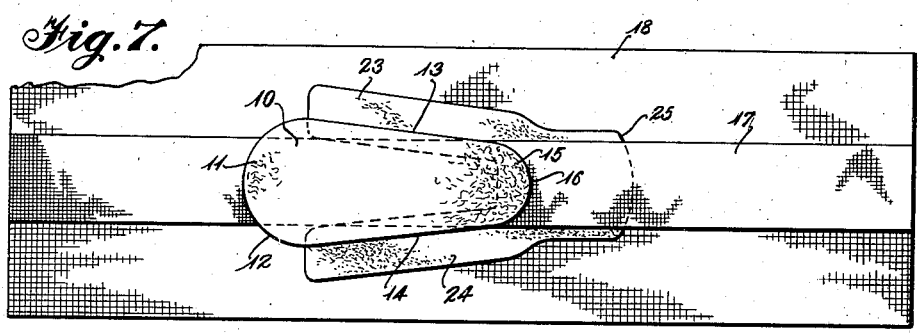
Figure 7 is a plan view of the catamenial device shown in Figure 5, except for the gauze envelope which is opened to expose the absorbent pad normally confined therein.

The catamenial structure selected for illustration comprises a preformed pad 10 or a plurality of superposed pads 10, in this instance, three, preferably stamped or otherwise shaped from cellular or other highly absorbent material. In the preferred embodiment, the pad or pads 10 are preferably though not essentially provided with an enlarged forward end region 11 that approximates the width of the standard catamenial pad 10'' (Figure 8), the forward end region 11 terminating, in this instance, in a curved edge 12 imparting a semicircular contour which merges into converging side edges 13 and 14. The inclined converging side edges 13 and 14 extend for a distance to define a comparatively smaller rearward end region 15 which, in this instance, terminates in a semicircular rearward end 16. A trapezoidal region 15' connects the end regions 11 and 15. The rearward regions 15' and 15 are shaped to conform more nearly to the anatomical contour of the external genital region, and avoid undesirable roping, twisting and packing.

In Figure 1, the various portions of the female pelvic region are diagrammatically shown in cross-section and respectively labeled "Uterus," "Vagina canal," "Bladder," "Rectum," "Labia minora," "Labia majora," etc., to illustrate the course of the menstrual flow from where it originates in the uterus. Thus, the flow is downward through the uterus, then downward and forward through the vaginal canal, and then out between the labia onto the pad, where, capillary action normally causes the discharged material to travel upwardly, instead of downwardly, contrary to the previously accepted theories on this subject. Figure 1 also diagrammatically illustrates average dimensions from the rectum to the mons Veneris as determined from many actual measurements of the female vulva. An interesting conclusion from the many measurements made is that the size of the female genitalia does not vary in direct proportion to the size of the individual during the child bearing period of a woman's life. As shown in Figure 1, the over-all distance from the anus or rectum to the mons Veneris over the outer curved surface of the vulva is approximately 5 inches. The distance in a straight line, or in projection, from the anus to the fossa navicularis is about 1¼ inches, from the fossa navicularis to the clitoris is about 2 inches, and from the clitoris to the mons Veneris is about 1½ inches. Hence, in constructing pads embodying the principles of the present invention, the pad is made sufficiently in excess of 5 inches, say 6 to 7½ inches, to adequately cover the parts.

Referring now to Figure 2, the measurements of the vulva, from side to side, is approximately ½ inch in the posterior faucet, about 1¼ inches at the vaginal opening, about 2¼ inches at the clitoris, and about 2 inches at the mons Veneris. These measurements are taken from the outer margin of one labia majora to the outer margin of the other, and serve as the basis for determining the width of the rearward region of the absorbent pad.

Upon reference to Figure 3 it will be noted that the wide substantially semicircular front region 11 of the pad 10 may be formed upon a radius of 1⅛ to 1½ inches so that the width of this portion of the pad may be made anywhere from 2¼ to 3 inches. The radius of the substantially semicircular rear region 15 of the pad 10 is indicated as varying from ½ to 1 inch so that the width of said rear end region may vary from 1 to 2 inches. The front and rear regions are connected by a substantially trapezoidal region 15'. The over-all dimension of the pad is indicated as 6 to 7½ inches.

Figure 8:
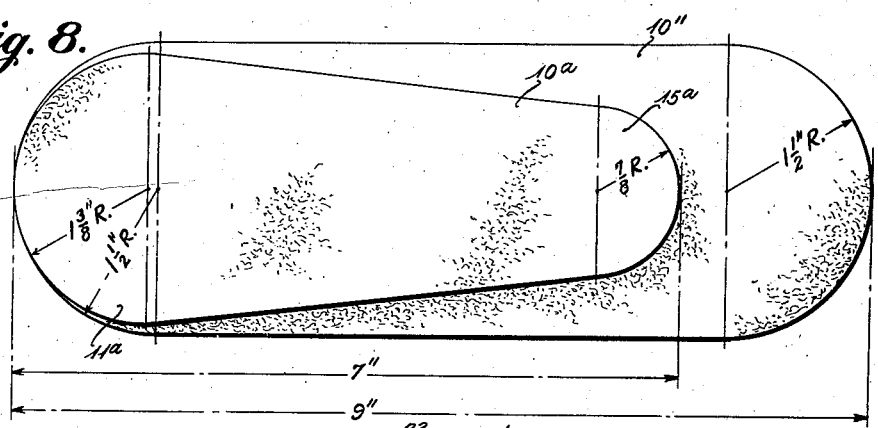
Figure 8 is a diagrammatic, dimensioned, view of a commercially feasible absorbent pad element for adult use, shown superimposed upon a conventional pad element to facilitate comparison in size and shape.

The dimensions given include a range which is satisfactory for the "junior" size pad, which may be made by using the lower limits, and the "regular or super" size, which may be made by using the upper limits. However, a pad having dimensions falling within the given ranges is quite satisfactory. Such pad is illustrated in Figure 8 and will be discussed in further detail hereinafter.

Figure 4 illustrates one manner in which the absorbent pad element 10 may be cut in mass production from a long strip of material X, with the only waste occurring at the rounded end portions 12 and 16 of the pad. A machine (not shown) is adapted to quickly stamp out the pad elements 10 from the strip X so that the adjacent pads are reversed, that is to say, the wide end region 11 of one pad is adjacent the narrow end region 15 of the next pad, and vice versa.

In order to support the absorbent pad or pads 10 in operative position over the female genitalia between the thighs and buttocks, an elongated supporting strip 17 (Fig. 5) of material possessing appreciably greater tensile strength than the absorbent pad or pads 10 and preferably of moistureproof material, is disposed longitudinally therebeneath and projects therebeyond for a distance sufficient to be looped through or engaged by the forward and rearward end members of the usual or any suitable or standard sanitary belt appliance (not shown) worn for that purpose. The elongated narrow strip 17 may be cut or otherwise shaped from paper, closely woven fabrics, or non-absorbent sheet material such as rubber, Cellophane, Celluloid, treated fabrics or paper and ordinary fabrics impregnated with moistureproof substances such as paraffine, wax, rubber, Celluloid or a combination of these substances. A suitable substance for this purpose is sold by The Menasha Products Co., Menasha, Wisconsin, under the trade name of "Parafilm," the wrapper of which bears the following patent numbers: 2,054,112, 2,054,114, 2,054,115, 2,074,319, 2,075,927, and 2,077,299. The longitudinal supporting strip 17 preferably is of a lesser width than the enlarged forward end 11 of the pads 10 and no greater or approximately equal in width to the rearward end 15. Thus, the strip 17 forms a support underlying the major portion of the area of the pad 10 to prevent roping and twisting of the pad in use. The provision of the longitudinal strip 17 of moistureproof material serves not only to afford added support for absorbent pad or pads 10 in operative position, but also prevents the striking through of uterine discharge to the down side of a fabric envelope 18 serving as a covering therefor.

To this end, a large mesh fabric sheet such as gauze 18 of substantially rectangular configuration, is folded around the pad or pads 10 and their longitudinal supporting strip 17 to constitute an overlapping rectangular envelope therefor. The gauze envelope 18 is, in this instance, commensurate in length with the strip 17 and provides extensions 18ᵃ and 18ᵇ adapted to be attached to the usual sanitary belt fastener members (not shown) in conjunction with the ends of the narrow strip 17 so that the envelope 18 serves to maintain the pad or pads 10 together with the strip 17 in their initial assembled relation. The longitudinal side edges 19—20 of the gauze envelope 18 will span the pad or pads 10 along the straight line commensurate with the widest portion thereof to fill and provide utmost lateral resiliency and self conformity with the relatively curved and varying contour of the external female genitalia without causing any roping, twisting, packing or discomfort of any kind to the wearer. This provides an envelope 18 that very nearly conforms to the rearward side of the pad or pads 10 save for slight lateral excess regions 21 and 22 that fold underneath the pad or pads 10 when their envelope 18 is applied in operative position to the peri-anal region of the female body.

In view of the fact that the pad 10 is to be worn with the rear end region 15 terminating at the anus, the forward gauze extension 18ᵃ may be made shorter than the rear extension 18b. This aids a user unfamiliar with the new type of pad to automatically apply it in the proper manner since the pad 10 will not be properly positioned relative to the vulva if the extension 18a is disposed toward the rear.

An important feature of the supporting strip 17 is that it is more stable than the loose mesh gauze envelope 18 and, therefore, is not subject to ready distortion as is said envelope. Hence, the supporting strip is thus capable of preventing the roping and twisting, above referred to.

Another important feature of the supporting strip 17 is that it serves to prevent roping of the rear extension 18b in the gluteal fold, the result of which would normally be to produce a cutting effect creating considerable discomfort to the wearer.

It should be appreciated that the thickness of the individual pad 10 or of a plurality of superposed pads 10 can be varied to meet the requirements of absorption and such depends entirely upon the dictates of commercial practice and the capacity of the particular absorbent material that is selected. As has been stated, the area of the pads 10 is substantially reduced in over-all size from standard catamenial pads now almost universally used and this elimination of excess mass is facilitated by resort to the comparatively narrow longitudinal strip 17 of moistureproof material. The moistureproof strip 17 eliminates excessive body in the pads normally thought necessary for support and inherent tensile requirements, and, further, serves to insure against striking through of the menstrual flow and uterine discharges.

In order to eliminate any possible discomfort caused by chafing and dermatitis in that portion of the thighs at the attachment of the abductor muscles on the ischial tuberosity and between the buttocks in the peri-anal region, the body contacting edges 13—14 of the gauze envelope 18 are provided with a glazed or smooth finish surface regions 23—24. The smooth non-friction edge lining regions 23—24 preferably adhere or constitute a composite part of the gauze 18 to constitute a continuous body contacting ribbon having a rearwardly extending longitudinal median projection defining a central upper lap 25. To this end, the smooth finish ribbon body contacting liner 23—24—25 preferably consists of a moistureproof material that is normally soft, smooth and stable at body temperatures and may advantageously be applied in the form of a composite film of paraffin, rubber, Celluloid, Cellophane or a combination thereof, or any other suitable material, such as "Parafilm," supra, possessed of similar functional characteristics. This smooth, soft and moistureproof liner 23—24—25 may be associated with the gauze envelope 18 by impregnation pressure application or thermally controlled composite processing to fill the voids of the gauze envelope 18 in the edge and upper longitudinal rearward region during or after the fabrication thereof.

It should be noted that the moistureproof liner ribbon 23—24 extends forwardly along the body contacting edge outlines 13—14 of envelope 18 substantially to the forward limit point where side edges 13—14 converge into curved forward end region 11 of the pad or pads 10. The central upper lap 25 of substantially rectangular configuration is, in this instance, formed integrally with edge outlines 13—14 of liner 23—24—25 and extends rearwardly along envelope 18 for an effective and suitable distance sufficient to cover the usual length of the female perineum. The association of the fabric envelope 18 with the moistureproof liner 23—24—25 may be accomplished simultaneous with the fabrication, manufacturing or formation of the envelope 18 with the pad or pads 10 during a selected or appropriate step in the production thereof. If found advantageous or should commercial practice so dictate, the preformed ribbon-like moistureproof liner 23—24—25 may be applied to the finished gauze enveloped catamenial pad 10 by pressure application in the presence or absence of heat. The extent, outline and location of the friction eliminating surface 23—24—25 may be varied to accomplish maximum comfort and minimum rubbing during body movement.

Referring now to Figure 8, a typical absorbent pad element 10a is shown superimposed upon a conventional pad element 10" in order to graphically illustrate the tremendous saving in material resulting from the present invention. The conventional pad 10" is illustrated with arcuate ends cut upon a radius of 1½ inches, the overall length of the pad being 9 inches. The pad 10a, which has dimensions that have been shown by numerous actual tests to give highly satisfactory results, is provided with a forward end region 11a having a radius of 1⅜ inches and a rear end region 15a having a radius of ⅞ of an inch, the overall length of the pad being 7 inches.

From simple arithmetic the area of the conventional pad will be found to be 25.06 square inches and the area of the pad 10a will be found to be 15.41 square inches. The difference in these areas is 9.65 square inches, and calculated in percentage, the pad 10a requires 38.4% less material than the conventional pad 10". Expressed another way, the material required to make 1000 conventional pads 10" would make 1613 of the pads 10a.

Figure 9:
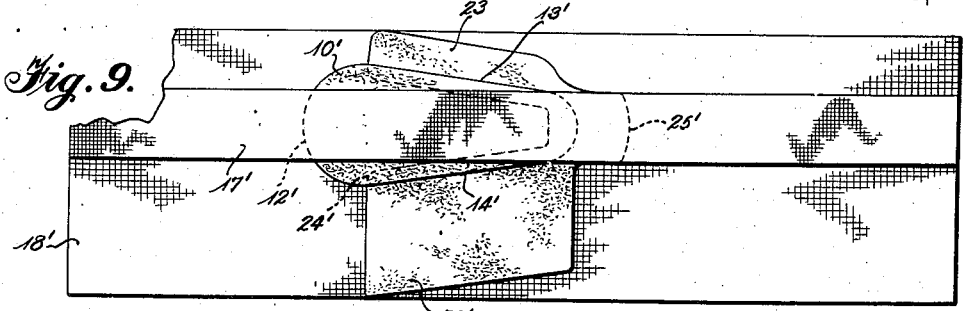
Figure 10:
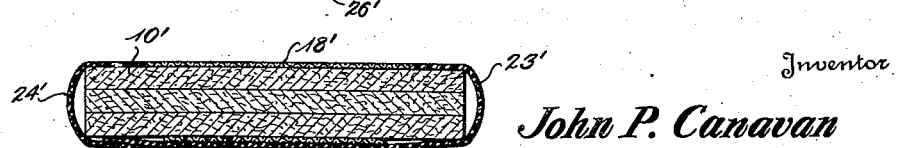
Figure 10 is a transverse sectional view through a pad of the type shown in Figure 9.

In the modified embodiment shown in Figures 9 and 10, the moistureproof liner 23'—24'—25' is provided with a laterally extending moisture impervious under-flap 26'. The under-flap or moisture impervious surface 26' is of substantially rectangular configuration formed integrally with the side edge surfacing ribbon 24'. The under-flap 26' extends laterally for a distance sufficient to cover the lower side of gauze envelope 18 when the open mesh fabric sheet 18' is folded over to envelop the absorbent pad or pads 10' and their moistureproof longitudinal supporting strip 17' to constitute a rectangular enclosure or envelope therefor.

As in the first described embodiment, a substantially rectangular central upper lap 25' is formed as a rearward longitudinal median extension of the smooth substantially U-shaped edge liners 23'—24', thereby defining a continuous body contacting ribbon 23'—24'—25' and a protective under-flap 26' that insures against moisture striking through the pad or pads 10'. It is clear that the length and lateral extent of the moistureproof and smooth surface liners 23'—24'—25'—26' may vary within a wide range; however, the edge liners 23'—24' extend forwardly to the merger point of the outwardly converging side edges 13'—14' of pad 10 with the forward curved end 12' thereof. Such may be modified to meet the requirements of commercial practice and the best results consistent with their intended purpose.

Figures 11 and 12 illustrate still another modified catamenial pad construction in which the supporting strip per se is eliminated and the gauze sheet or envelope is so wrapped and folded around the absorbent pad as to provide, for example, four overlapping layers of fabric on the under side thereof which serve as a "built-in" band-like support preventing twisting and roping of the otherwise loosely woven gauze envelope when in use.

As shown, a gauze sheet 29 extends in a single layer 30 over the upper surface of a pad 10$^d$ and has a portion 31 which runs along the lower side of said pad and is folded at 32 to provide a reversely extending flap 33 overlying the portion 31. The gauze wrapper 29 also has a portion 34 adjacent the flap 33 which in turn is folded at 35 to provide a second flap 36. Thus, four layers of fabric 31, 33, 34 and 36 extend along the underside of the pad 10$^d$, said layers forming in effect an integral band having sufficient tensile strength to prevent any appreciable stretching or distortion of the gauze envelope and thus serve as a substitute for the supporting strip 17. It will be apparent from Figure 11 that the overlapped portions 31, 33, 34 and 36 have a minimum width equal to that of the narrowest or rear end region 15$^d$ of the pad 10$^d$.

Figure 13 diagrammatically illustrates another manner of folding the gauze sheet 29 wherein the flaps 33 and 36 are folded in interlocking relation.

Figure 14 illustrates an absorbent pad element 10$^b$ having a contour slightly different from the pad element 10 shown in Figure 3, but which, nevertheless, is capable of carrying out the principles of the present invention. In this modified form of pad 10$^b$, the side edges 13$^b$ and 14$^b$ do not converge throughout the length of the pad, but merely converge from the enlarged forward end region 11$^b$ to an intermediate point indicated by the line 40 and then extend substantially parallel to the rearmost extremity of said pad. As illustrated, the front end portion 11$^b$ may be formed on a radius of 1⅛ to 1½ inches, whereas the rear end region 15$^b$ is formed substantially rectangular and has a width of 1 to 2 inches and a length of 1¼ to 2¼ inches. The portion of the pad 10$^b$ between the substantially semicircular forward end portion 11$^b$ and the substantially rectangular rear end region 15$^b$ is substantially trapezoidal, and the overall length of the pad may vary from 6 to 7½ inches.

It will be understood that the absorbent pad element 10$^b$ shown in Figure 14 is adapted to be associated with a gauze sheet and supporting strip similar to that shown and described in connection with Figures 5 and 9. Alternatively, the pad 10$^b$ may be employed with a gauze sheet folded about said pad in the manner shown in either Figure 12 or 13.

Figure 16:
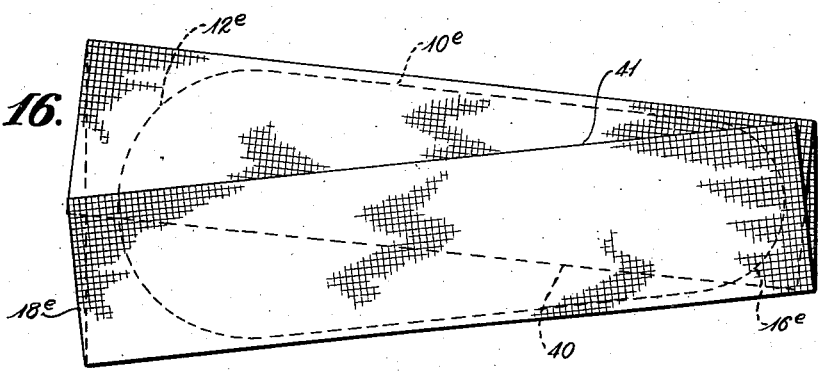
Figure 16 is an enlarged view of the absorbent pad and gauze wrapper shown in Figure 15.
Figure 15:
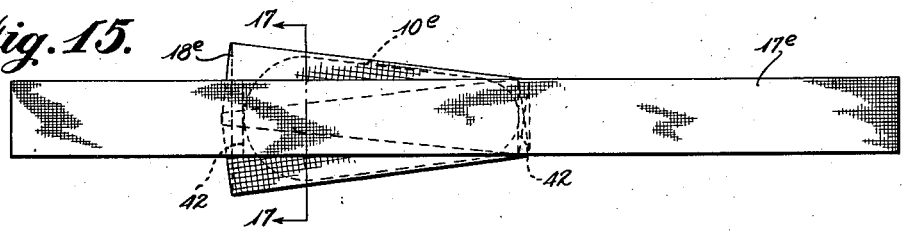
Figure 15 is a view of the lower side of another pad construction embodying the principles of the present invention in which the gauze wrapper is only of slightly greater length than the absorbent pad and in which the supporting strip or band is adhesively secured to the pad.
Figure 17:
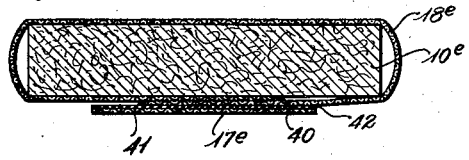
Figure 17 is an inverted sectional view taken on the line 17—17 of Figure 15 and illustrating by exaggerated thicknesses the relationship of the overlapping edges of the gauze wrapper, and the relative positions of the adhesive material and the supporting strip before the parts are adhesively bonded by heat and pressure.

Figures 15, 16 and 17 illustrate another embodiment of the invention by means of which a maximum of saving in both pad material and in the gauze wrapper can be effected. In this form of the invention an absorbent pad 10$^e$ is enclosed in an abbreviated loose mesh gauze sheet or wrapper 18$^e$, which preferably does not extend more than half an inch beyond the ends 12$^e$ and 16$^e$ of said pad. The gauze sheet 18$^e$ has longitudinal edge portions 40 and 41 which overlap on the underside of the pad, as is best illustrated in Figure 17. A flat longitudinal supporting strip or band 17$^e$ of relatively closer weave and greater tensile strength than the wrapper 18$^e$ is disposed adjacent the overlapped portions 40 and 41 of the gauze wrapper. A strip of "Parafilm" 42, which may be of the same length as the pad 10$^e$, is interposed between the supporting strip 17$^e$ and the overlapped edges 40 and 41 of the gauze wrapper 18$^e$, as shown in Figure 17. The pad 10$^e$, wrapper 18$^e$ and supporting strip 17$^e$ are all bonded together by the strip of "Parafilm" 42 upon the application of heat and pressure, it being understood that the heated "Parafilm" will permeate said gauze wrapper and form a direct bond between said pad and supporting strip, thereby effecting a slight change in the relation of the parts shown in Figure 17. In this manner, the wrapper 18$^e$ is positively maintained about the pad 10$^e$ and the wrapped pad is secured in predetermined assembled relation to the supporting strip 17e.

The supporting strip 17$^e$, as in the previous constructions, may be made of water resistant material, or not, as desired, but in the instant modification need not of itself be moisture-proof inasmuch as the strip of "Parafilm" 42 serves the further purpose of moisture proofing said supporting strip and thereby prevent striking through. Also, as in the previous constructions, the side edges of the wrapped pad may be made non-chafing and moisture resistant, if desired. It will be noted from Figure 15 that the strip 17$^e$ is preferably not wider than the narrow end 16$^e$ of the pad 10$^e$ and that said supporting strip extends rearwardly a greater distance from said pad than forwardly, whereby to aid in properly positioning the rear end of said pad so that it does not extend rearwardly beyond the anus.

Alternatively, the supporting strip 17$^e$ obviously may be disposed in contact with the pad 10$^e$; the strip of "Parafilm" 42 placed in contact with the supporting strip 17$^e$; and the edge portions 40 and 41 of the gauze wrapper overlapped upon the strip of "Parafilm," and all of the parts secured together in predetermined assembled relation by heat and pressure, without departing from the principles of the present invention.

It is believed that the saving in wrapping material effected by the construction shown in Figures 15 to 17 will be manifest when the fact is considered that the wrapping on the conventional Kotex pad is approximately 19½ inches long and 9½ inches wide and has an area of 185.05 square inches; whereas the gauze sheet or wrapper 18$^e$ at most will not be longer than 8½ inches and not more than about 7 inches wide, the area of such sheet being 59½ square inches. Considering the material employed in the supporting strip 17$^e$, such strip may be made about 19½ inches long at most and about 2 inches wide, and thus have an area of 39 square inches. When this is added to the area of the material of the gauze sheet 18$^e$ a total area of 98½ square inches of material is needed, compared with the 185.05 square inches of material in the conventional pad. In other words, the present invention, even when employing the maximum amount of fabric, requires less than one-half of the material now employed in the wrapper of conventional pads. The vast amount of material saved by the abbreviated absorbent pad element per se has already been emphasized. When the saving in material of both the wrapper and pad element are combined, the economy effected is obviously enormous.

Figure 18:
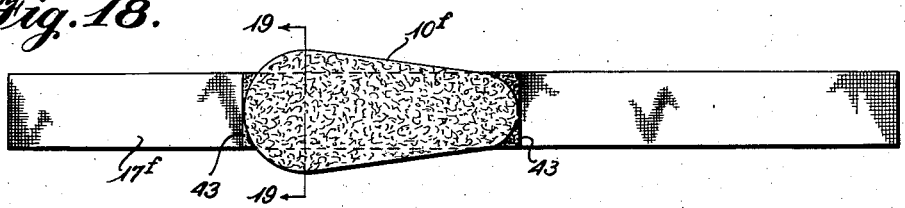
Figure 19:
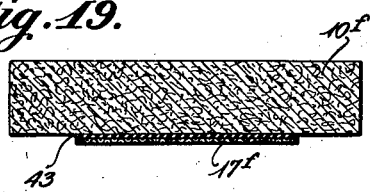
Figure 19 is a sectional view taken on the line 19—19 of Figure 18.

Figures 18 and 19 illustrate still another embodiment of the invention in which even greater saving is effected by the total elimination of the gauze sheet or wrapper. This further saving is effected by employing an absorbent pad 10$^f$ of material which will not disintegrate in the presence of moisture, such as, for example the absorbent cotton felt disclosed in copending application, Serial No. 457,456 filed on September 5, 1942 and entitled Absorbent felt. In view of the fact that said cotton felt will not disintegrate in the presence of moisture, as is the case with the cellucotton now used in conventional pads, no wrapper is needed to hold the pad together while in use.

Figure 20:
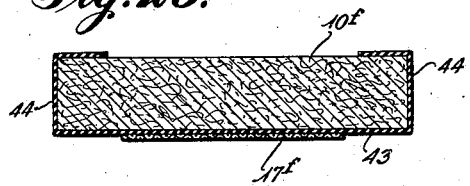
Figure 20 is a view similar to Figure 19 but illustrates a further modification in which the adhesive material is extended around the side edges of the pad to present non-chafing surfaces.

As is best shown in Figure 19, a flat supporting strip or band 17f, whose width is approximately equal to that of the narrowest portion of the pad 10f, is adhesively bonded to the underside of said pad by a strip of "Parafilm" 43 which need be no longer than the length of said pad. The strip of "Parafilm" 43 will effect bonding of the pad 10f and the supporting strip 17f in the desired predetermined relation upon application of heat and pressure, as aforedescribed. However, in addition to bonding the pad 10f and strip 17f together, the strip of "Parafilm" 43 serves also as a moisture proofing medium to prevent striking through. The edges of the pad 10f may be provided with a suitable non-chafing coating, if desired, or the strip of "Parafilm" 43 may be extended around the side edges of the pad as indicated at 44 in Figure 20 for this purpose.

The structures described herein are designed not only to give maximum protection and comfort, but also conform to modern manufacturing methods, create an appreciable saving in material, accomplish a definite economy in manufacture, and provide maximum absorption in the region where such is required without the usual chafing and striking through defects of known catamenial pads. Then, too, the "built-in" band or the separate center longitudinal strip which extends for the entire length of the pad including its gauze envelope, serves to prevent chafing due to roping or "bunching" of the pad, adds security to the user, discourages striking through of any moisture to the lower side of the gauze envelope, increases invisibility when worn beneath scant clothing, prevents the hair on the vulva from becoming enmeshed in the gauze covering the pad, prevents roping of the gauze extensions and thereby eliminates undesirable cutting or chafing in the gluteal fold, increases the security of fastening and holding the pad or pads in position, and minimizes the size and thickness of the pad or pads.

Catamenial pads have a tendency to move forwardly during the act of walking, and the provision of a center supporting strip with the selected outline of the pad or pads 10—10e prevents such forward displacement. The additional feature of a smooth, glazed coating or covering of moisture proof material on the lateral edge and rearward portion of the pad, affords non-chafing contact with the upper regions of the wearers' thighs and perineum, results in a tremendous improvement in comfort by the elimination of chafing and consequent dermatitis or skin inflammation.

Then, too, the feature of sealing the under-side of the pad or pads throughout the absorption area with a moistureproof composition prevents the striking through of moisture which is annoying, uncomfortable and often results in uncontrolled soiling of adjacent articles of clothing. Furthermore the moisture is prevented from striking through the lateral sides of the pad which often inflames the skin and results in a most unsanitary condition.

Various changes may be made in the embodiments of the invention herein specifically described without departing from the invention or sacrificing any of the advantages or features thereof, and nothing herein shall be construed as limitation upon the invention, its structural embodiment or concept as to the whole or any part thereof except as defined in the amended claims. Moreover, it will be understood that certain of the features disclosed herein may be advantageously incorporated in conventional pad manufacture, and hence, the invention is not to be construed as limited to the specific constructions illustrated herein as operative examples of the invention.

I claim:

1. A catamenial device comprising: a pad of predetermined shape including a body of absorbent material of substantially uniform thickness having a narrow rear end region, a relatively wider front end region, and an intermediate region of non-uniform width connecting said front and rear regions and providing converging side edges between said front and rear regions, said intermediate and rear end regions being sized and shaped to fit against and conform to the anatomical contour of the external genitalia and the adjacent parts of the inner thighs of the wearer without any substantial lateral compression of said absorbent pad, the over-all length of said absorbent pad being such as to extend from the anus to a point slightly beyond the mons Veneris; and an open mesh gauze sheet of substantially greater length than said absorbent pad enclosing said pad and providing extensions extending rearwardly and forwardly of the ends of said pad adapted to be secured to a suitable sanitary belt, one thickness of said gauze sheet overlying the upper surface of said absorbent pad, the side edges of said sheet being folded in overlapping relation along the lower surface of said pad to provide more than two thicknesses of fabric, said overlapped portions being of a width approximately equal to the narrow rear end region of said absorbent pad and serving as a band-like support underlying the major portion of the area of said pad to prevent roping and twisting of said pad in use and to further provide a rearward gauze extension which will not rope and produce a cutting effect in the gluteal fold, said pad being adapted to be worn with the narrow rear end region terminating at the anus, whereby the usual bunching and packing rearwardly of the anus is eliminated and the discomfort to the wearer incident thereto is avoided.

2. A catamenial device comprising: a pad of predetermined shape including a body of absorbent material of substantially uniform thickness having a substantially semicircular forward end region formed on a radius of about 1⅛ to 1½ inches, a substantially semicircular rear end region formed on a radius of about ½ to one inch, and a substantially trapezoidal region connecting said substantially semicircular end regions, said absorbent pad having an over-all length of about 6 to 7½ inches, said overall length of said pad being such as to extend from the anus to a point slightly beyond the mons Veneris; and an open mesh gauze sheet of substantially greater length than said absorbent pad enclosing said pad and providing extensions extending rearwardly and forwardly of the ends of said pad adapted to be secured to a suitable sanitary belt, one thickness of said gauze sheet overlying the upper surface of said absorbent pad, the side edges of said sheet being folded in overlapping relation along the lower surface of said pad to provide four thicknesses of fabric, said overlapped portions having a width of 1 to 2 inches, but in any event being of a width approximately equal to the diameter of the narrow rear end region of said absorbent pad, said overlapped portions serving as a band-like support underlying the major portion of the area of said pad to prevent roping and twisting of said pad in use and to further provide a rearward gauze extension which will not rope and produce a cutting effect in the gluteal fold, said pad being adapted to be worn with the narrow rear end region terminating at the anus, whereby the usual bunching and packing rearwardly of the anus is eliminated and the discomfort to the wearer incident thereto is avoided.

3. A catamenial device comprising: an absorbent pad of substantially uniform thickness; and means providing a longitudinal band-like support along the underside of said pad comprising a gauze envelope having reversely folded edge portions providing overlapping layers of fabric of substantial width arranged medially of the side edges of said pad.

JOHN P. CANAVAN.